US009283942B2

(12) United States Patent
Minato et al.

(10) Patent No.: US 9,283,942 B2
(45) Date of Patent: Mar. 15, 2016

(54) VEHICLE COMPRESSED AIR SUPPLY DEVICE

(75) Inventors: Ichiro Minato, Tokyo (JP); Hiroki Hasebe, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 79 days.

(21) Appl. No.: 13/577,201

(22) PCT Filed: Feb. 3, 2011

(86) PCT No.: PCT/JP2011/052799
§ 371 (c)(1),
(2), (4) Date: Aug. 3, 2012

(87) PCT Pub. No.: WO2011/096589
PCT Pub. Date: Aug. 11, 2011

(65) Prior Publication Data
US 2012/0306259 A1   Dec. 6, 2012

(30) Foreign Application Priority Data

Feb. 4, 2010  (JP) .................................. 2010-022802

(51) Int. Cl.
*B60T 17/02*   (2006.01)
*B60T 13/68*   (2006.01)
*B60T 13/66*   (2006.01)

(52) U.S. Cl.
CPC ............. *B60T 13/683* (2013.01); *B60T 13/662* (2013.01)

(58) Field of Classification Search
CPC ...... B60T 13/662; B60T 13/683; B60T 17/02
USPC ............ 188/156; 303/9.66, 122.15, 127, 3, 7, 303/89, 122.04, 122.05, 123, 191; 137/625.25, 625.67, 625.69, 625.2, 137/625.6, 625, 469, 509, 510
See application file for complete search history.

(56) References Cited

U.S. PATENT DOCUMENTS

| 2,576,517 A | * | 11/1951 | Jurs ................................ | 137/469 |
| 4,095,680 A | * | 6/1978 | Vogelsang .................... | 188/156 |

(Continued)

FOREIGN PATENT DOCUMENTS

| CN | 1181043 A | 5/1998 |
| CN | 101500868 A | 8/2009 |

(Continued)

OTHER PUBLICATIONS

International Search Report; PCT/JP2011/052799; Mar. 8, 2011.
(Continued)

*Primary Examiner* — Bradley King
*Assistant Examiner* — Stephen Bowes
(74) *Attorney, Agent, or Firm* — Studebaker & Brackett PC

(57) ABSTRACT

Disclosed is a vehicle compressed air supply device, comprising pressure maintenance valves for service brakes, which are positioned between a junction chamber and compressed air channels for primary brakes; a pressure maintenance valve for the parking brake, which is positioned between the junction chamber and a compressed air channel for the parking brake; and a pressure maintenance valve, positioned on a supply path that connects the pressure maintenance valve for the parking, brake with the junction chamber, and which is closed until the pressure of the compressed air that is supplied to the compressed air channels for the primary brakes reaches a prescribed pressure value. The pressure maintenance valve has the same structure as the pressure maintenance valves for service brakes and the pressure maintenance valve for the parking brake.

4 Claims, 2 Drawing Sheets

(56) References Cited

U.S. PATENT DOCUMENTS

| | | | |
|---|---|---|---|
| 4,243,070 A * | 1/1981 | Jackson | 137/510 |
| 6,089,831 A * | 7/2000 | Bruehmann et al. | 417/282 |
| 6,276,761 B1 * | 8/2001 | Beck | 303/9.61 |
| 6,375,277 B1 | 4/2002 | Carroll | |
| 2004/0195910 A1 | 10/2004 | Aumuller et al. | |
| 2009/0280959 A1 | 11/2009 | Bensch et al. | |
| 2010/0036576 A1 * | 2/2010 | Diekmeyer et al. | 701/70 |

FOREIGN PATENT DOCUMENTS

| | | | | |
|---|---|---|---|---|
| JP | 54132051 A | * | 10/1979 | F16J 3/02 |
| JP | 10-100888 A | | 4/1998 | |
| JP | 2000-043710 A | | 2/2000 | |
| JP | 2002-240704 A | | 8/2002 | |
| JP | 2006-168393 A | | 6/2006 | |
| JP | 2009-023627 A | | 2/2009 | |
| WO | 2008/043403 A1 | | 4/2008 | |

OTHER PUBLICATIONS

The first Office Action issued by the State Intellectual Property Office of P.R. China on May 6, 2014, which corresponds to Chinese Patent Application No. 201180009231.3 and is related to U.S. Appl. No. 13/577,201; with English language translation.

An Office Action; "Notification of Reasons for Refusal," issued by the Japanese Patent Office on Jun. 23, 2014, which corresponds to Japanese Patent Application No. 2013-158948 and is related to U.S. Appl. No. 13/577,201; with English language translation.

* cited by examiner

VEHICLE COMPRESSED AIR SUPPLY DEVICE

TECHNICAL FIELD

The present invention relates to a vehicle compressed air supply device which supplies compressed air to a brake of a vehicle.

BACKGROUND ART

In the related art, a large vehicle such as a truck or a bus employs pneumatic brake device using compressed air as an operating fluid which operates a brake chamber. In the type of brake device, a vehicle compressed air supply device supplying compressed air to each brake chamber is mounted.

The vehicle compressed air supply device includes an air compressor and retains the compressed air discharged from the air compressor in an air tank, and supplies the compressed air inside the air tank to each brake circuit if required. In addition, the vehicle compressed air supply device includes pressure protection valves corresponding to each of brake circuits respectively. When one of the brake circuits is failed, the pressure protection valve corresponding to the brake circuit, which is failed, is closed and thereby the pressure protection valve has a function to protect the other brake circuits which are not failed.

In addition, recently, from the viewpoint of further safety, when a pressure of the compressed air supplied to a service brake circuit does not reaches a predetermined pressure value, the pressure protection valve corresponding to a parking brake circuit is closed and thereby the pressure supply to the parking brake is stopped. Usually, the service brake actuates a braking force with the pressure of the supplied compressed air. Meanwhile, the parking brake is a spring brake using a bias force of a spring and is configured such that a braking force is released by the pressure of the supplied, compressed air. Thus, a control valve is provided upstream the pressure protection valve corresponding to the parking brake circuit and in a case where the service brake is not actuated because the pressure of the compressed air supplied to the service brake circuit is not enough, the control valve is closed and thereby the pressure supply to the parking brake circuit is stopped and the parking brake cannot be released (for example, PTL 1).

CITATION LIST

Patent Literature

[PTL 1] JP-A-2009-23627

SUMMARY OF INVENTION

Technical Problem

However, since the control valve of the related art is controlled to be opened and closed by a command pressure of a solenoid valve which is controlled by a detected pressure of the service brake circuit, it is necessary that a solenoid valve or a line which outputs the command pressure from the solenoid valve to the control valve is provided in the device, and it is a problem that a configuration of the device becomes complicated.

An object of the invention is to provide a vehicle compressed air supply device in which a simplification of the device configuration is realized.

Solution to Problem

In order to accomplish the object described above, a vehicle compressed air supply device of the invention which includes an air compressor mounted on a vehicle and supplies compressed air discharged from the air compressor to each of a plurality of loads of the vehicle, includes: a junction chamber which is provided at a discharge line of the air compressor and distributes the compressed air to each of the loads; a service brake pressure protection valve which is disposed between the junction chamber and a service brake circuit provided as the loads; a parking brake pressure protection valve which is disposed between the junction chamber and a parking brake circuit provided as the loads; and a valve unit which is disposed in a flow path connecting the parking brake pressure protection valve and the junction chamber, and is closed until pressure of the compressed air supplied to the service brake circuit reaches a predetermined pressure value, wherein the valve unit is formed of a pressure protection valve having the same structure as each of the pressure protection valves.

In the configuration described above, the valve unit, the service brake pressure protection valve and the parking brake pressure protection valve may have structure including a partition wall which divides an inner space and an outer space inside a main body; a valve seat which is provided at the partition wall; and valve body which abuts the valve seat with an elastic force respectively, the service brake pressure protection valve and the parking brake pressure protection valve introduce an air into the inner space and discharge the air from the outer space and on the other hand, the valve unit is connected to an air supply path so as to introduce the air into the outer space and discharge the air from the inner space.

In addition, the valve unit may be set to open at a pressure value higher than the service brake pressure protection valve and the parking brake pressure protection valve, and set to be closed in a pressure value lower than the service brake pressure protection valve and the parking brake pressure protection valve.

In addition, an air communication pipe, which connects downstream of the parking brake pressure protection valve and the discharge line, may be provided and a check valve, which operates when an air pressure of the parking brake circuit increases higher than an air pressure of the discharge line, may be provided at the air communication pipe.

Advantageous Effects of Invention

According to the invention, since the valve unit, which is closed until the pressure of the compressed air supplied to the service brake circuit reaches a predetermined pressure value, is formed of the pressure protection valve having the same structure as each of the pressure protection valves, parts can be produced in common; the solenoid valve which is controlled by the detected pressure of the service brake circuit or a line which outputs the command pressure from the solenoid valve is not required and thereby the simplification of the device configuration can be realized.

BRIEF DESCRIPTION OF DRAWINGS

FIG. 2A illustrates a valve closed state and FIG. 2B illustrates a valve opened state.

DESCRIPTION OF EMBODIMENTS

Hereinafter, an embodiment of the invention is described with reference to the drawings.

Figure 1:
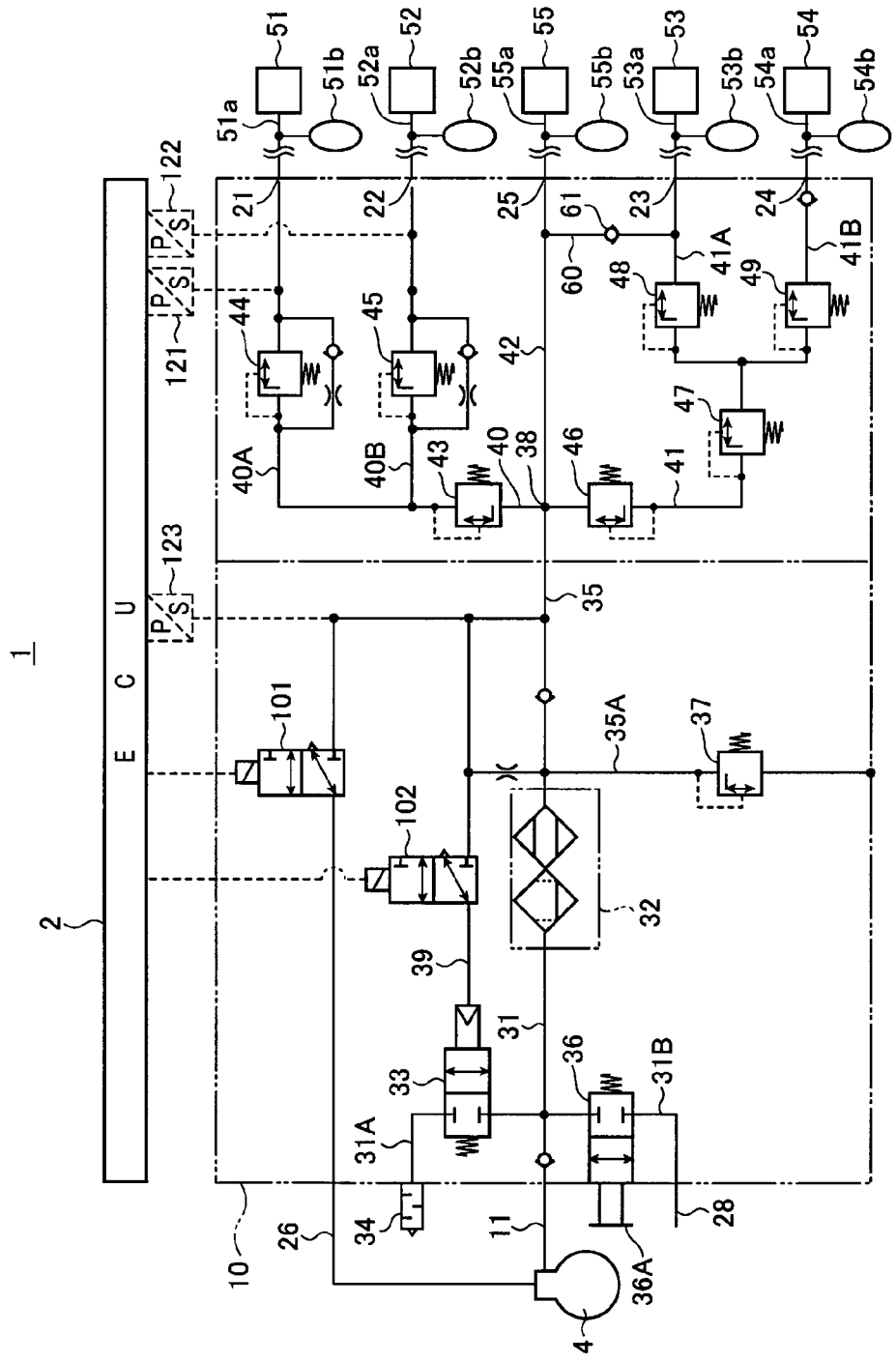
FIG. 1 is a view illustrating a configuration of a compressed air supply system according to an embodiment.

FIG. 1 is a view illustrating a configuration of a compressed air supply system 1 according to the embodiment in which the invention is applied.

The compressed air supply system 1 (a vehicle compressed air supply device) illustrated FIG. 1 is a device which supplies a compressed air for driving to pneumatic brake device mounted on for example, a large vehicle such as a truck or a bus, and is configured to include a compressor 4 (an air compressor), an ECU 2 controlling the compressor 4, and an air dryer module 10 removing moisture of compressed air discharged from the compressor 4 and supplying dried compressed air to a load (for example, a brake device) of the vehicle.

The ECU 2 controls an engine of the vehicle based on a vehicle speed or the like of the vehicle on which the compressed air supply system 1 is mounted and controls operation of the compressor 4 and the air dryer module 10. In addition, in the ECU 2, information relating to a running situation of the vehicle such as information relating to the vehicle speed of the vehicle and information relating to a running distance of the vehicle is input and information relating to a operation situation of the air dryer 32.

The air dryer module 10 includes an output port 21 where a load 51 is connected, an output port 22 where a load 52 is connected, an output port 23 where a load 53 is connected, an output port 24 where a load 54 is connected and an output port 25 where a load 55 is connected.

The loads 51 to 53 configure the brake device described above, and in the embodiment, the load 51 is a main brake (a service brake) of a front wheel, the load 52 is a main brake (a service brake) of a rear wheel and the load 53 is a parking brake. In addition, the loads 54 and 55 are accessories such as a horn and a clutch driving mechanism which are driven by the compressed air.

In addition, the loads 51 to 55 include compressed air circuits (a service brake circuit and a parking brake circuit) 51a to 55a in which compressed air flows. In the compressed air circuits 51a to 55a, air tanks 51b to 55b are connected respectively.

The air dryer module 10 includes electromagnetic valves 101 and 102 which are opened and closed by the control of the ECU 2, and pressure sensors 121, 122 and 123 which detect an air pressure in each portion of the air dryer module 10 and thereby outputs the detected value to the ECU 2. The ECU 2 opens and closes the electromagnetic valves 101 and 102, based on the detected value of the pressure sensors 121 to 123.

The compressor 4 is connected to the engine via an auxiliary belt (not shown) and compresses the air with a driving force of the engine. The compressor 4 is controlled by the air pressure and the electromagnetic valve 101 is connected to a control line 26 thereof. A load state where the compressor 4 compresses the air and an unload state where the compression is not performed are switched by the opening and closing of the electromagnetic valve 101.

A discharge pipe (a discharge line) 11 of the compressor 4 is connected to a flow-in pipe 31 of the air dryer module 10 and the air dryer 32 is connected to the flow-in pipe 31. The air dryer 32 accommodates desiccant inside a case and foreign material such as moisture included in the compressed air, which is discharged from the compressor 4, is removed by desiccant.

A junction pipe 31A branched from the flow-in pipe 31 is connected between the compressor 4 and the air dryer 32. In the junction pipe 31A, an exhaust valve 33 and an exhaust opening 34 are connected in series. When the exhaust valve 33 is opened, the compressed air inside the main body of the air dryer 32 is discharged from the exhaust opening 34 to the outside directly. The exhaust valve 33 is controlled by the air pressure and the electromagnetic valve 102 is connected to the control line 39. The electromagnetic valve 102 is opened and closed by the control of the ECU 2 and provide the air pressure of downstream of the air dryer 32 to the exhaust valve 33 in an opened state of the valve. The exhaust valve 33 is usually closed and only when the air pressure is applied from the electromagnetic valve 102, the exhaust valve 33 is opened and thereby the compressed air is discharged from the exhaust opening 34.

Here, in a state where the air pressure inside the air dryer module 10 is high enough, when the exhaust valve 33 is opened, the compressed air, which is accumulated downstream side (for example, a supply path 35 or inside the air tank 55a) than the air dryer 32, is made to flow backward inside the case of the air dryer 32 and discharged from the exhaust opening 34. At this time, since the air passing through the case becomes a super-dried state by rapid decompression and moisture from desiccant inside the case is captured and thereby desiccant is regenerated. Desiccant after regeneration is configured such that adsorption ability adsorbing the moisture is recovered and the moisture of the compressed air can be removed. The regeneration operation is performed every time which is set beforehand due to the opening of electromagnetic valve 102 by the ECU 2 or a predetermined regeneration timing (a predetermined timing) such as a case where the air pressure or the like inside the air dryer module 10 satisfies conditions which are set beforehand.

In addition, another junction pipe 31B, which is branched from the flow-in pipe 31, is connected between the compressor 4 and the air dryer 32, and the junction pipe 31B is connected to a supply port 28 via an air pressure supply valve 36. The air supply valve 36 includes an operation switch 36A which is manually operated to open and close. When the operation switch 36A is pushed, the air supply valve 36 is opened and then the compressed air is discharged from the supply port 28. The supply port 28 is configured for example, to connect to a valve (an opening in which the air enters) of a tire of the vehicle and the air can be supplied in the tire by operating the operation switch 36A. In addition, a safety valve 37 is provided at the junction pipe 35A branched from the supply path 35 downstream of the air dryer 32. The safety valve 37 is a valve that is opened when the air pressure inside the supply path 35 or inside the air tanks 51b to 55b is abnormally increased, and thereby the pressure is escaped to the outside.

A junction chamber 38 is connected to the supply path 35 downstream than the air dryer 32 and three supply paths 40, 41 and 42 are connected to the junction chamber 38. A reducing valve 43 is provided at the supply path 40 and the supply path 40 is branched to two supply paths 40A and 40B downstream the reducing valve 43. Each of the supply paths 40A and 40B is connected to each of the output ports 21 and 22 via the service brake pressure protection valves 44 and 45 respectively. In addition, the reducing valve 46 and the pressure protection valve (the valve unit) 47 are provided at another supply path (a flow path) 41 connected to the junction chamber 38. The supply path 41 is branched to two supply paths 41A and 41B at downstream of the pressure protection valve 47. Each of the supply paths 41A and 41B is connected to each of the output ports 23 and 24 via the parking brake pressure protection valve 48 and the accessory pressure protection valve 49 respectively. Furthermore, another supply path 42 connected to the junction chamber 38 is connected to the output port 25.

The service brake pressure protection valves 44 and 45 are arranged with a throttle valve and a check valve in parallel. The service brake pressure protection valves 44 and 45, the parking brake pressure protection valve 48 and the accessory pressure protection valve 49 are closed at the loads 51 to 54 connected to the corresponding output ports 21 to 24 respectively when the compressed air circuits 51a to 54a, where the compressed air flows, are failed, in other words, the air pressure is lower than a predetermined closing pressure value at the circuit. In addition, the service brake pressure protection valves 44 and 45, the parking brake pressure valve protection valve 48 and the accessory pressure protection valve 49 are configured to open when the air pressure inside the supply path, where each of pressure protection valves is provided, is higher than a predetermined opening valve pressure value.

In addition, a bleed-back path (an air communication pipe) 60, which communicates each of supply paths 42 and 41A, is provided between the supply path 42 where the junction chamber 38 is connected and the supply path 41A downstream of the parking brake pressure protection valve 48. The feedback path 60 includes a reflex valve (a check valve 61) which blocks the flow of the air from the supply path 42 (in other words, the junction chamber 38) to the output port 23. The check valve 61 is opened when the air pressure inside the supply path 41A is higher than the air pressure inside the supply path 42 and has a function to escape the pressure inside (for example, the parking brake air tank 53b) the supply path 41A.

The pressure sensor 123 detects the air pressure of the supply path 35, the pressure sensor 121 detects the air pressure downstream of the service brake pressure protection valve 44 of one side in other words, the air pressure of the output port 21 and the pressure sensor 122 detects the air pressure of the output port 22 which is downstream of the service brake pressure protection valve 45 of the other side. The detection values are output from each of pressure sensors 121 to 123 to the ECU 2 at any time.

The braking force of the parking brake device of the vehicle corresponding to the load 53 is released by the air pressure and thereby the vehicle can be run. Specifically, the parking brake opens a brake shoe with the force of the spring and exerts the braking force during the parking, and the brake shoe is closed against the force of the spring by the air pressure supplied from the air dryer module 10 during releasing.

Thus, the parking brake device can release the parking brake by the air pressure in a case where the compressed air inside the air tank 53b is filled enough. Meanwhile, in a case where the compressed air circuit 53a corresponding to the parking brake is failed, since the parking brake pressure protection valve 48 is closed and thereby the supply of the compressed air to the compressed air circuit 53a is cut, the parking brake cannot be released.

Here, it is a premise that the parking brake device can be released during the main brake device is able to use in view of safety, and in a case where the air pressure of air tanks 51b and 52b corresponding to the main brake device is not enough, it is desirable that the parking brake be not released.

Thus, in an initial state (for example, in a case where the pressure inside the air tanks 51b and 52b is not enough) time of a new vehicle or time of chicking the vehicle, it is necessary that the supply of the compressed air to the compressed air circuit 53a corresponding to the parking brake is closed until the air pressure inside the air tanks 51b and 52b becomes enough. In the configuration, the pressure protection valve 47 is provided at the supply path 41 connected to the junction chamber 38 and opening valve pressure set value of the pressure protection valve 47 is set higher than the opening valve pressure set value of the service brake pressure protection valves 44 and 45. Accordingly, the compressed air is prevented from supplying to the air tank 53b of the parking brake device before the air pressure is enough inside the air tanks 51b and 52b of the main brake device.

Furthermore, in the configuration, the bleed-back path 60 is provided and thereby the parking brake cannot be released when the compressed air circuits 51a and 52a corresponding to the main brake device are failed. Specifically, when the compressed air circuits 51a and 52a are failed, since the air pressure inside the supply path 42 decreases, the check valve 61 of the feedback path 60 is opened and the air inside the air tank 53b is discharged via the feedback path 60. Furthermore, the parking brake pressure protection valve 48 is closed according to the decrease of the air pressure inside the air tank 53b. Thus, the supply of the compressed air to the compressed air circuit 53a is cut and the parking brake cannot be released.

In addition, the pressure protection valve 47 is configured having the same structure as the service brake pressure protection valves 44 and 45, the parking brake pressure protection valve 48 and the accessory pressure protection valve 49. Accordingly, since each of pressure protection valves can be produced in common and the solenoid valve which is controlled by the detected pressure of the service brake circuit or a line which outputs the command pressure from the solenoid valve is not required as the control valve of the related art thereby the simplification of the device configuration can be realized.

Next, the pressure protection valve 47 is described.

Figure 2:
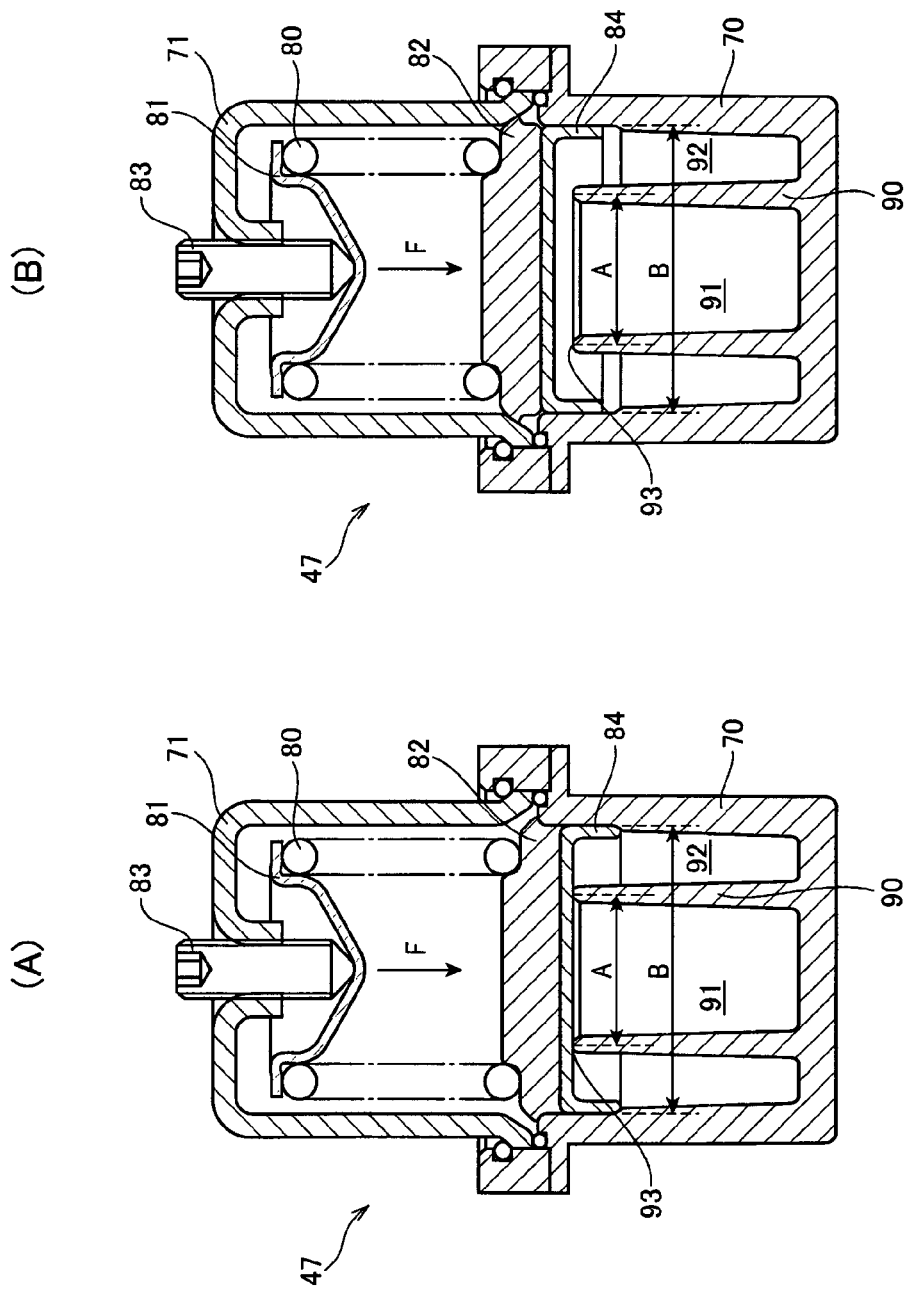
FIG. 2 is a schematic side cross-sectional view of a pressure protection valve.

FIG. 2 is a schematic side cross-sectional view of the pressure protection valve 47, FIG. 2A illustrates the closed state of the valve and FIG. 2B illustrates the opened state of the valve.

As shown in FIG. 2A, the pressure protection valve 47 includes a valve main body (a main body) 70 and a cover body 71 provided at the upper side of the valve main body 70. In the inside of the cover body 71, a coil spring 80, a first spring receiving member 81 which receives an upper end of the coil spring 80, and a second spring receiving member 82 which receives a lower end of the coil spring 80, and at the upper end portion of the cover body 71, an adjustment spring 83 is attached. A tip of the adjustment spring 83 is tapered and abuts to an inner bottom portion of the second spring receiving member 82. The tip thereof can be descended while pushing the coil spring 80 according to the depth of a screw.

In addition, at the lower surface of the second spring receiving member 82, a valve body 84, which is formed substantially in the same size as an inner diameter of the valve main body 70, is attached and moves along an axial direction of the coil spring 80 with the second spring receiving member 82.

Meanwhile, a partition wall 90, which is vertically and cylindrically arranged inside the valve main body 70 and a cylindrical inner space 91 and a donut-shaped outer space 92 are divided by the partition wall 90. The partition wall 90 is provided at a position of a substantially half of the inner diameter of the valve main body 70 and a circular valve seat 93 is formed at the upper end portion of the partition wall 90. For example, when the air pressure of the compressed air made to flow in from the inner space 91 is higher than a spring force F of the coil spring 80, the valve body 84 moves in a direction away from the valve seat 93 due to the air pressure and the pressure protection valve 47 is opened.

A port (not shown) is formed at a position where the inner space 91 and the outer space 92 are communicated at the valve main body 70, and supply paths shown in FIG. 1 are disposed to communicate the via the port.

Here, the pressure protection valve 47 is described, however in the embodiment, the service brake pressure protection valves 44 and 45, and the parking brake pressure protection valve 48 are also configured to have the same structure as the pressure protection valve 47. Thus, in a case where the opening valve pressure set value of the pressure protection valve 47 is set higher than the opening valve pressure set value of the service brake pressure protection valves 44 and 45, the height of the coil spring 80 may be adjusted by adjusting the adjustment spring 83.

Meanwhile, in a case where the opening valve pressure set value of the pressure protection valve 47 is set higher than the opening pressure set value of the service brake pressure protection valves 44 and 45, it is general that the closing pressure set value of the pressure protection valve 47 is also higher than the closing pressure set value of the service brake pressure protection valves 44 and 45.

In this case, when the air pressure inside the supply path decreases lower than a predetermined closing pressure set value, initially, the pressure protection valve 47 is closed and inconvenience occurs. Thus, in the configuration, service brake pressure protection valves 44 and 45, and the parking brake pressure protection valve 48 are connected to each of supply paths 40A, 40B and 41A wherein a port communicating with the outer space 92 is an air flow-in port and a port communicating with the inner space 91 is an air flow-out port. In contrast, the pressure protection valve 47 is connected to the supply path 41 wherein a port communicating with the inner space 91 is the air flow-in port and a port communicating with the outer space 92 is the air flow-out port contrary to the service brake pressure protection valves 44 and 45, and the parking brake pressure protection valve 48.

In the pressure protection valve of this type, it is recognized that a differential pressure between the opening pressure set value and the closing pressure set value becomes large in a case where the port communicating with the inner space 91 is used as the air flow-in port and the port communicating with the outer space 92 is used as the air flow-out port compared to the case where the port communicating with the outer space 92 is used as the air flow-in port and the port communicating with the inner space 91 is used as the air flow-out port.

Next, description is given where a connection position of the port with respect to the supply path is changed and thereby the differential pressure between the opening pressure set value and the closing pressure set value is changed. Here, a diameter of the partition wall corresponding to the inner space 91 is referred to as A, a inner diameter of the valve main body 70 corresponding to the inner space 91 and the outer space 92 is referred to as B, the spring force is referred to as F, the opening pressure set value is referred to as P, the closing pressure set value is referred to as P'. In addition, for the convenience of the description, the pressure is present at a side where the air flows in, however, the atmosphere pressure (0 Pa) is present at a side where the air flows out.

(1) In a case where the port communicating with the outer space 92 is used as the air flow-in port and the portion communicating with the inner space 91 is used as the air flow-out port, the balance of the force during opening of the valve become below.

$$P = 4F/\pi \times 1/(B^2 - A^2) \quad (1)$$

Meanwhile, the balance of the force during closing of the valve become below.

$$P' = 4F/\pi \times (1/B^2) \quad (2)$$

The differential pressure ΔP1 becomes below from expressions (1) and (2) described above.

$$\Delta P1 = P - P' = 4F/\pi \times [A^2/B^2(B^2 - A^2)] \quad (3)$$

(2) In a case where the port communicating with the inner space 91 is used as the air flow-in port and the portion communicating with the outer space 92 is used as the air flow-out port, the balance of the force during opening of the valve become below.

$$P = 4F/\pi \times (1/A^2) \quad (4)$$

Meanwhile, the balance of the force during closing of the valve become below.

$$P' = 4F/\pi \times (1/B^2) \quad (5)$$

The differential pressure ΔP2 becomes below from expressions (4) and (5) described above.

$$\Delta P2 = P - P' = 4F/\pi \times (B^2 - A^2)/A^2 B^2 \quad (6)$$

In the embodiment, since a ranges B=(1.5 to 2.5)×A are set, when the ranges substitute the expressions (3) and (6), the differential pressures become below.

$$\Delta P1 < \Delta P2 \quad (7)$$

The differential pressure between the opening pressure set value and the closing pressure set value becomes large in a case where the port communicating with the inner space 91 is used as the air flow-in port and the port communicating with the outer space 92 is used as the air flow-out port compared to the case where the port communicating with the outer space 92 is used as the air flow-in port and the port communicating with the inner space 91 is used as the air flow-out port.

In addition, the reason why B>1.5A is because the partition wall 90 is difficult to produce inside the valve main body 70 on the production process, in a case of the same or below conditions. In addition, the reason why B<2.5A is because the valve main body 70 is increased in size in a case of the same or above conditions. It is recognized that B=(1.8 to 1.9)×A is the optimized in the conditions.

Thus, the closing pressure set value of the pressure protection valve 47 can be decreased lower than the closing pressure set value of the service brake pressure protection valves 44 and 45, and the parking brake pressure protection valve 48, and the inconvenience that the pressure protection valve 47 is closed earlier than the service brake pressure protection valves 44 and 45 can be avoid, with a simple configuration in which the connection position of the port with respect to the supply path is changed.

As described above, according to the embodiment, the invention includes the service brake pressure protection valves 44 and 45 which are arranged between the junction chamber 38 and the main brake compressed air circuits 51a and 52a, the parking brake pressure protection valve 48 which is arranged between the junction chamber 38 and the parking brake compressed air circuit 53a, the pressure protection valve 47 which is arranged at the supply path 41 connecting the parking brake pressure protection valve 48 and the junction chamber 38, and opens the valve until the pressure of compressed air supplied to the main brake compressed air circuit 51a and 52a. In addition, since the pressure protection valve 47 has the same structure as the service brake pressure protection valves 44 and 45, and the parking brake pressure protection valve 48, each of pressure protection valves can be produced in common and the solenoid valve which is controlled by the detected pressure of the service brake circuit or a line which outputs the command pressure from the solenoid valve is not required as the control valve of the related art and thereby the simplification of the device configuration can be realized.

In addition, according to the embodiment, since service brake pressure protection valves 44 and 45, and the parking brake pressure protection valve 48 are connected to the air supply path wherein the air is made to flow into the inner space 91 and the air is discharged from the outer space 92, in contrast, the pressure protection valve 47 is connected to the air supply path wherein the air is made to flow into the outer space 92 and the air is discharged from the inner space 91 contrary to the service brake pressure protection valves 44 and 45, and the parking brake pressure protection valve 48, the closing pressure set value of the pressure protection valve 47 can be decreased lower than the closing pressure set value of the service brake pressure protection valves 44 and 45, and the parking brake pressure protection valve 48, and the inconvenience that the pressure protection valve 47 is closed earlier than the service brake pressure protection valves 44 and 45 can be avoid, with a simple configuration in which the positions of the flowing in and the discharging of the air are changed with respect to the air supply path.

In addition, according to the embodiment, since the pressure protection valve 47 is set to open at a pressure value higher than the service brake pressure protection valves 44 and 45, and the parking brake pressure protection valve 48, and is set to be closed in a pressure value lower than the service brake pressure protection valves 44 and 45, and the parking brake pressure protection valve 48, advantages can be realized simultaneously in which the compressed air is prevented from supplying to the air tank 53b of the parking brake device before the air pressure is enough inside the air tanks 51b and 52b of the main brake device and the inconvenience that the parking brake pressure protection valve 48 is closed earlier than the service brake pressure protection valves 44 and 45 can be avoid with the simple configuration.

In addition, according to the embodiment, since the bleed-back path 60 is provided which connects the supply path 41A downstream of the parking brake pressure protection valve 48 and the supply path 42 extending from the junction chamber 38, and the check valve 61, which is operated when the air pressure of the parking brake compressed air circuit 53a increases higher than the air pressure of the supply path 42, is provided at the bleed-back path 60, in a case where the compressed air circuits 51a and 52a of the main brake device is failed, the parking brake cannot be released because the compressed air inside the compressed air circuit 53a of the parking brake device can be opened, even with a simple configuration in which the pressure protection valve 47 is provided.

In addition, the embodiment described above illustrates an embodiment that applies the invention and the invention is not limited to the embodiment. For example, the vehicle as the applying object of the vehicle compressed air supply device of the invention is not limited specifically. The vehicle may be any of a large vehicle, a small vehicle, a special vehicle, a wrecker vehicle, a two-wheeled vehicle or a three-wheeled vehicle, and the scale and form thereof are arbitrary.

REFERENCE SIGNS LIST

1: compressed air supply system (compressed air supply device)
4: compressor
31: flow-in pipe (discharge line)
38: junction chamber
40A, 40B, 41A, 41B, 42: supply path
41: supply path (path)
44, 45: service brake pressure protection valve
47: pressure protection valve (valve unit)
48: perking brake pressure protection valve
49: accessory pressure protection valve
51 to 55: load
51a, 52a: compressed air path (service brake circuit)
53a: compressed air path (perking brake circuit)
51b to 55b: air tank
60: bleed-back path (air communication pipe)
61: check valve
70: valve main body (main body)
84: valve body
90: partition wall
91: inner space
92: outer space
93: valve seat

The invention claimed is:

1. A vehicle compressed air supply device which includes an air compressor mounted on a vehicle and supplies compressed air discharged from the air compressor to each of a plurality of loads of the vehicle, comprising:
   a junction chamber which is provided at a discharge line of the air compressor and distributes the compressed air to each of the loads;
   a service brake pressure protection valve which is disposed between the junction chamber and a service brake circuit provided as the loads;
   a parking brake pressure protection valve which is disposed between the junction chamber and a parking brake circuit provided as the load; and
   a valve unit which is disposed in a flow path connecting the parking brake pressure protection valve and the junction chamber, and is closed until pressure of the compressed air supplied to the service brake circuit reaches a predetermined pressure value,
   wherein the valve unit is formed of a pressure protection valve having the same structure as each of the pressure protection valves,
   wherein the valve unit, the service brake pressure protection valve and the parking brake pressure protection valve have a structure including a main body with a partition wall which divides an inner space and an outer space inside the main body where the outer space surrounds the inner space, a valve seat which is provided at the partition wall; and a valve body which abuts the valve seat with an elastic force respectively,
   the service brake pressure protection valve is configured such that air is introduced from the compressor via said junction chamber to an outer space of the parking brake pressure protection valve and the air is discharged from an inner space of the parking brake pressure protection valve and the parking brake pressure protection valve is configured such that the air is introduced from the compressor via said junction chamber to an outer space of the service brake pressure protection valve and the air is discharged from an inner space of the service brake pressure protection valve, and
   the valve unit is configured such that the air is introduced from the compressor via said junction chamber to an inner space of the valve unit and the air is discharged from an outer space of the valve unit.

2. The vehicle compressed air supply device according to claim 1, said structure further includes a spring to exert the elastic force applied to the valve body in a direction towards the valve seat and a spring force adjusting member which adjusts the elastic force generated by the spring to set an opening pressure of the valve;
- wherein the valve unit is set to open at a pressure value higher than the service brake pressure protection valve and the parking brake pressure protection valve, and set to be closed in a pressure value lower than the service brake pressure protection valve and the parking brake pressure protection valve.

3. The vehicle compressed air supply device according to claim 1,
- wherein an air communication pipe, which connects downstream of the parking brake pressure protection valve and the discharge line, is provided, and
- a check valve, which operates when an air pressure of the parking brake circuit increases higher than an air pressure of the discharge line, is provided at the air communication pipe.

4. The vehicle compressed air supply device according to claim 1, wherein for at least one of the service brake pressure protection valve, parking brake pressure protection valve or valve unit, said partition wall is in a cylindrical shape, which divides the outer space and the inner space where the inner space is inside of the partition wall and outer space is outside of the partition wall,
- wherein the valve seat is provided at around a circular lead end of the partition wall and the valve body is subject to the elastic force generated by a coil spring which acts in a direction to move the valve body toward the valve seat.

* * * * *